(12) United States Patent
Yamazaki et al.

(10) Patent No.: US 12,423,824 B2
(45) Date of Patent: Sep. 23, 2025

(54) INFORMATION PROCESSING APPARATUS, INFORMATION PROCESSING METHOD, AND NON-TRANSITORY STORAGE MEDIUM

(71) Applicant: CANON KABUSHIKI KAISHA, Tokyo (JP)

(72) Inventors: Fukashi Yamazaki, Kanagawa (JP); Yuta Narukiyo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 18/057,133

(22) Filed: Nov. 18, 2022

(65) Prior Publication Data
US 2023/0169660 A1 Jun. 1, 2023

(30) Foreign Application Priority Data
Nov. 26, 2021 (JP) .................. 2021-192191

(51) Int. Cl.
*G06T 7/11* (2017.01)
*G06T 5/70* (2024.01)
(Continued)

(52) U.S. Cl.
CPC ............... *G06T 7/11* (2017.01); *G06T 5/70* (2024.01); *G06T 7/12* (2017.01); *G06T 7/149* (2017.01);
(Continued)

(58) Field of Classification Search
CPC ..... G06T 7/11; G06T 5/70; G06T 7/12; G06T 7/149; G06T 7/174; G06T 2200/04;
(Continued)

(56) References Cited

U.S. PATENT DOCUMENTS 10,751,548 B2 * 8/2020 Han .................. G16H 30/40
2011/0216951 A1 * 9/2011 Ye ..................... G06T 7/143
382/128
(Continued)

FOREIGN PATENT DOCUMENTS

JP 2019526863 A 9/2019

OTHER PUBLICATIONS

Boykov, Y., et al., "Graph Cuts and Efficient N-D Image Segmentation", International Journal of Computer Vision, 2006, pp. 109-131, vol. 70, No. 2.

*Primary Examiner* — Bobbak Safaipour
*Assistant Examiner* — Michael Kim Maiden
(74) *Attorney, Agent, or Firm* — Canon U.S.A., Inc. IP Division (57) ABSTRACT

An information processing apparatus includes a first acquisition unit configured to acquire first region information about an object on first two-dimensional tomographic image data orthogonal to a first axis of three-dimensional tomographic image data, a second acquisition unit configured to acquire second region information about the object on second two-dimensional tomographic image data orthogonal to a second axis different from the first axis of the three-dimensional tomographic image data, and a generation unit configured to generate a three-dimensional likelihood map representing objectness of the object as three-dimensional ground truth image data corresponding to the three-dimensional tomographic image data based on the first region information and the second region information.

16 Claims, 5 Drawing Sheets

(51) Int. Cl.
 *G06T 7/12* (2017.01)
 *G06T 7/149* (2017.01)
 *G06T 7/174* (2017.01)

(52) U.S. Cl.
 CPC .......... *G06T 7/174* (2017.01); *G06T 2200/04* (2013.01); *G06T 2207/10081* (2013.01); *G06T 2207/20076* (2013.01); *G06T 2207/20081* (2013.01); *G06T 2207/30056* (2013.01); *G06T 2207/30096* (2013.01)

(58) Field of Classification Search
 CPC . G06T 2207/10081; G06T 2207/20076; G06T 2207/20081; G06T 2207/30056; G06T 2207/30096; G06T 2207/20084
 See application file for complete search history.

(56) References Cited

U.S. PATENT DOCUMENTS

| | | | |
|---|---|---|---|
| 2019/0205606 A1* | 7/2019 | Zhou | G06F 18/285 |
| 2021/0093275 A1* | 4/2021 | Hoernig | A61B 6/4035 |
| 2021/0233240 A1* | 7/2021 | Yan | A61B 6/032 |
| 2022/0020203 A1* | 1/2022 | Paglieroni | G06T 15/005 |

* cited by examiner

INFORMATION PROCESSING APPARATUS, INFORMATION PROCESSING METHOD, AND NON-TRANSITORY STORAGE MEDIUM

BACKGROUND

Field of Disclosure

The present disclosure relates to an information processing apparatus that generates three-dimensional ground truth image data, an information processing method, and a non-transitory storage medium.

Description of Related Art

The accuracy of machine learning-based segmentation depends on the number of pieces of training image data and ground truth image data. It is thus desirable to prepare a large amount of pieces of training image data and ground truth image data. Creating ground truth image data requires a large amount of work. Therefore, a technique for efficiently creating ground truth image data is important. For example, Y. Boykov et al., "Graph Cuts and Efficient N-D Image Segmentation", International Journal of Computer Vision, 70(2), 2006 discuss a technique for creating ground truth image data by providing foreground information (information about an object region) and background information (information about a region other than the object region), utilizing a semi-automatic segmentation technique that requires a user to input region information.

However, in the case of creating ground truth image data utilizing the semi-automatic segmentation technique, the user needs to repeatedly correct the foreground information and the background information. Creating three-dimensional ground truth image data for three-dimensional tomographic image data such as computed tomographic (CT) image data requires a large amount of work to repeatedly correct the ground truth image data.

SUMMARY OF THE DISCLOSURE

The present disclosure is directed to providing an information processing apparatus capable of efficiently generating three-dimensional ground truth image data representing an object region.

According to an aspect of the present disclosure, an information processing apparatus includes a first acquisition unit configured to acquire first region information about an object on first two-dimensional tomographic image data orthogonal to a first axis of three-dimensional tomographic image data, a second acquisition unit configured to acquire second region information about the object on second two-dimensional tomographic image data orthogonal to a second axis different from the first axis of the three-dimensional tomographic image data, and a generation unit configured to generate a three-dimensional likelihood map representing objectness of the object as three-dimensional ground truth image data corresponding to the three-dimensional tomographic image data based on the first region information and the second region information.

Further features of the present disclosure will become apparent from the following description of exemplary embodiments with reference to the attached drawings.

DESCRIPTION OF THE EMBODIMENTS

Exemplary embodiments of an information processing apparatus according to the present disclosure will be described below with reference to the drawings. The same or equivalent components, members, and processes illustrated in the drawings are denoted by the same reference numerals, and the same description will not be repeated as appropriate. In the drawings, the illustration of some of the components, members, and processes is omitted as appropriate.

The following exemplary embodiments of the present disclosure will be described using an example where a liver tumor is captured in abdominal computed tomographic (CT) image data obtained by imaging using an X-ray CT imaging apparatus. The abdominal CT image data is an example of three-dimensional tomographic image data. The present disclosure can also be applied to three-dimensional tomographic image data such as tomographic image data captured by a nuclear magnetic resonance imaging (MRI) apparatus, a positron emission tomography (PET) imaging apparatus, or an ultrasonic imaging apparatus. The present disclosure can be applied not only to a liver tumor, but also to other lesions (e.g., a pulmonary nodule, a lymph node, and bone metastasis) and any other structure capable of being represented by three-dimensional tomographic image data. The exemplary embodiments of the present disclosure are not limited to the following exemplary embodiments.

In a first exemplary embodiment of the present disclosure, a method of generating a three-dimensional likelihood map representing a liver-tumor likelihood (hereinafter referred to as a liver-tumor likelihood map), in which a liver tumor is set as an object and the liver tumor is approximated to an ellipsoid, as three-dimensional ground truth image data will be described. In the present exemplary embodiment, a first axis is, for example, an axis along the axial plane, and first two-dimensional tomographic image data taken along the axial plane is axial section image data corresponding to abdominal CT image data. The axial section image data is, for example, axial tomographic image data (e.g., axial section image data with a maximum liver tumor area) that favorably represents the shape of the liver tumor in a plurality of pieces of axial section image data constituting an abdominal CT image, and is hereinafter referred to as "representative axial section image data". Further, first region information is two-dimensional ground truth image data representing the liver tumor region captured in the representative axial section image data, and is hereinafter referred to as "liver-tumor axial ground truth image data". A second axis that is different from the first axis is, for example, an axis along a coronal plane which is orthogonal to the axial plane, and second two-dimensional tomographic image data taken along the coronal plane is coronal section image data corresponding to abdominal CT image data. The coronal section image data is, for example, coronal tomographic image data (e.g., coronal section image data with a maximum liver tumor area) that favorably represents the shape of the liver tumor in a plurality of pieces of coronal section image data constituting an abdominal CT image, and is hereinafter referred to as "representative coronal section image data". Second region information is two-dimensional ground truth image data representing the liver tumor region captured in the representative coronal section image data, and is hereinafter referred to as "liver-tumor coronal ground truth image data".

An information processing apparatus 100 according to the present exemplary embodiment generates a correct liver-tumor three-dimensional likelihood map such that it spreads in an ellipsoidal shape (likelihood is concentrically and continuously varied), based on the liver-tumor axial ground truth image data and the liver-tumor coronal ground truth image data. Specifically, the information processing apparatus 100 first determines a reference point based on the liver-tumor axial ground truth image data and the liver-tumor coronal ground truth image data. Then, the information processing apparatus 100 generates a liver-tumor three-dimensional likelihood map such that it spreads in an ellipsoidal shape (likelihood is concentrically and continuously varied) about the reference point. In this case, the likelihood of each voxel included in the liver-tumor three-dimensional likelihood map is set by a multivariate Gaussian function that is a probability distribution function. In other words, the information processing apparatus 100 according to the present exemplary embodiment generates the correct liver-tumor three-dimensional likelihood map with the reference point at the center thereof in accordance with the multivariate Gaussian distribution.

Further, the information processing apparatus 100 according to the present exemplary embodiment trains a training model by a machine learning-based method using the correct liver-tumor three-dimensional likelihood map as the three-dimensional ground truth image data. Specifically, the information processing apparatus 100 trains a training model using the three-dimensional tomographic image data corresponding to the three-dimensional abdominal CT image data and the correct liver-tumor three-dimensional likelihood map corresponding to the abdominal CT image data as training data. In the present exemplary embodiment, three-dimensional (3D) U-Net that is one of convolutional neural networks (CNNs) in deep learning techniques is used as a training model. Training the 3D U-Net using the above-described training data enables inference of objectness of a target object, such as a liver-tumor-like region.

In the following description, assume that an axial axis, a coronal axis, and a sagittal axis correspond to a Z-axis, a Y-axis, and an X-axis, respectively, in an image data coordinate system. Specifically, the representative axial section image data and the liver-tumor axial ground truth image data are image data on an XY-plane, and the representative coronal section image data and the liver-tumor coronal ground truth image data are image data on an XZ-plane.

Figure 1:
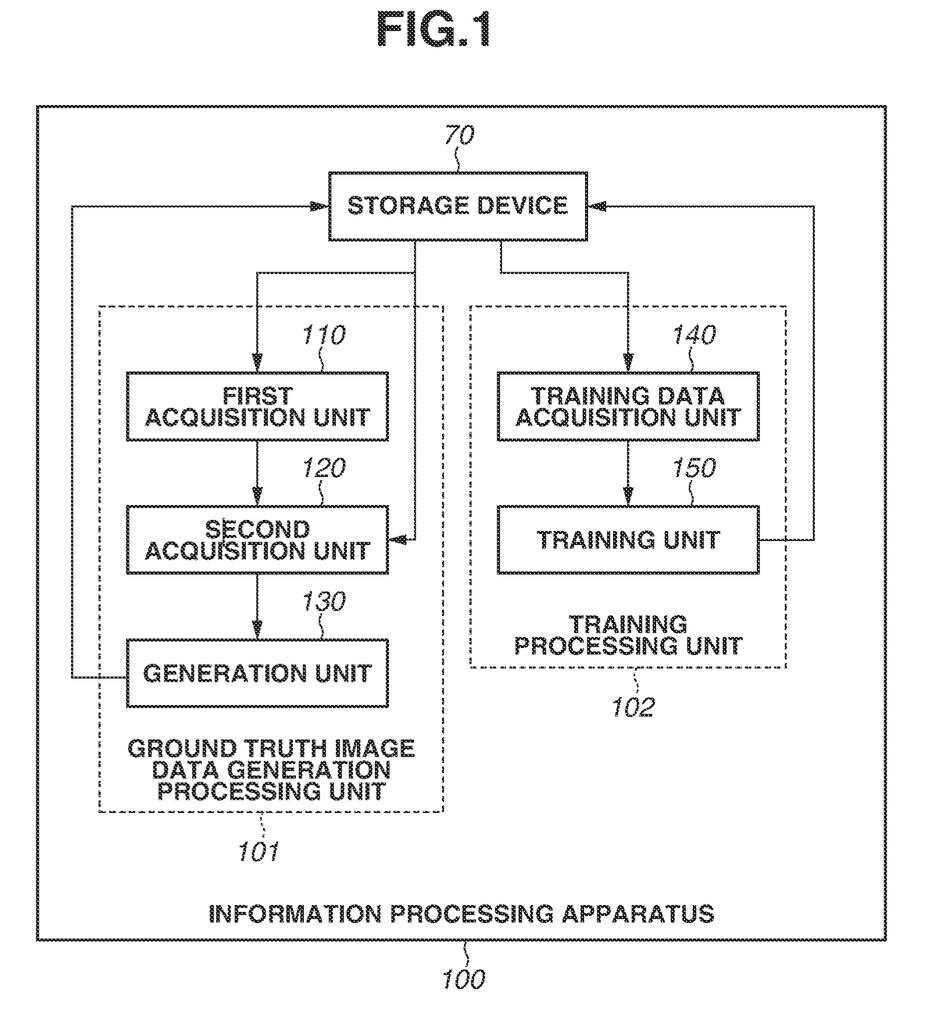
FIG. 1 is a block diagram illustrating an example of a functional configuration of an information processing apparatus according to a first exemplary embodiment.

A functional configuration of the information processing apparatus 100 according to the present exemplary embodiment will be described below with reference to FIG. 1. As illustrated in FIG. 1, the information processing apparatus 100 includes a ground truth image data generation processing unit 101 including a first acquisition unit 110, a second acquisition unit 120, and a generation unit 130, and a training processing unit 102 including a training data acquisition unit 140 and a training unit 150. The information processing apparatus 100 according to the present exemplary embodiment also includes a storage device 70. The ground truth image data generation processing unit 101 and the training processing unit 102 may function as information processing systems composed of different devices, respectively.

The storage device 70 is an example of a computer-readable storage medium, and is a large-capacity storage device as typified by a hard disk drive (HDD) and a solid-state drive (SSD).

The storage device 70 stores the abdominal CT image data as the three-dimensional tomographic image data in which the object is captured, the liver-tumor axial ground truth image data as the first region information, and the liver-tumor coronal ground truth image data as the second region information. The liver-tumor axial ground truth image data and the liver-tumor coronal ground truth image data are, for example, two-dimensional mask image data annotated by a doctor or a radiographer. In the present exemplary embodiment, the liver-tumor axial ground truth image data and the liver-tumor coronal ground truth image data are each liver tumor two-dimensional mask image data corresponding to representative two-dimensional tomographic image data (e.g., two-dimensional tomographic image data with a maximum liver tumor area) selected from among the pieces of two-dimensional tomographic image data orthogonal to the corresponding axis. The liver-tumor axial ground truth image data and the liver-tumor coronal ground truth image data are each binary image data in which the value of each voxel included in the liver tumor region is represented by "1" and each of the values of voxels other than the voxels included in the liver tumor region is represented by "0". The above-described form of representing the mask image data is merely an example. Any data form can be used as long as the form can represent a liver tumor region. For example, the first region information and the second region information may each be a multi-valued image representing liver-tumor likelihood for each voxel. The storage device 70 may be separately provided as another device different from the information processing apparatus 100 to be described below.

The configuration of the ground truth image data generation processing unit 101 in the information processing apparatus 100 will now be described.

The first acquisition unit 110 acquires, from the storage device 70, the liver-tumor axial ground truth image data as the first region information about the object on the first two-dimensional tomographic image data orthogonal to the first axis of the three-dimensional tomographic image data, and transmits the liver-tumor axial ground truth image data to the generation unit 130.

The second acquisition unit 120 acquires, from the storage device 70, the liver-tumor coronal ground truth image data as the second region information about the object on the second two-dimensional tomographic image data orthogonal to the second axis different from the first axis of the three-dimensional tomographic image data, and transmits the liver-tumor coronal ground truth image data to the generation unit 130.

The generation unit 130 generates the three-dimensional likelihood map representing the objectness of the object as the three-dimensional ground truth image data corresponding to the three-dimensional tomographic image data based on the first region information and the second region information. Specifically, the generation unit 130 receives the liver-tumor axial ground truth image data as the first region information from the first acquisition unit 110, and also receives the liver-tumor coronal ground truth image data as the second region information from the second acquisition unit 120. Next, the generation unit 130 determines the reference point based on the liver-tumor axial ground truth image data and the liver-tumor coronal ground truth image data, and generates the correct liver-tumor three-dimensional likelihood map based on the multivariate Gaussian function. Further, the generation unit 130 stores the correct liver-tumor three-dimensional likelihood map in the storage device 70. The correct liver-tumor three-dimensional likelihood map generated by the generation unit 130 is image data having the same image data size as the abdominal CT image data and is continuous-valued image data in which a voxel with a higher liver-tumor likelihood is represented by a value closer to "1" and a voxel with a lower liver-tumor likelihood is represented by a value closer to "0". The above-described form of representing the correct liver-tumor three-dimensional likelihood map is merely an example, and any form may be used as long as the form can represent the degree of liver-tumor likelihood.

In sum, the ground truth image data generation processing unit 101 in the information processing apparatus 100 includes the first acquisition unit 110 that acquires the first region information about the object on the first two-dimensional tomographic image data orthogonal to the first axis of the three-dimensional tomographic image data, the second acquisition unit 120 that acquires the second region information about the object on the second two-dimensional tomographic image data orthogonal to the second axis different from the first axis of the three-dimensional tomographic image data, and the generation unit 130 that generates the three-dimensional likelihood map representing the objectness of the object as the three-dimensional ground truth image data corresponding to the three-dimensional tomographic image data based on the first region information and the second region information. Objectness is a measurement of how much the neighborhood surrounding each voxel resembles a target object.

Next, the configuration of the training processing unit 102 in the information processing apparatus 100 will be described.

The training data acquisition unit 140 receives a plurality of pieces of abdominal CT image data as three-dimensional learning image data and a plurality of three-dimensional correct liver-tumor likelihood maps as three-dimensional ground truth image data respectively corresponding to the plurality of pieces of abdominal CT image data from the storage device 70, and transmits the received image data and likelihood maps to the training unit 150.

The training unit 150 receives the plurality of pieces of three-dimensional abdominal CT image data and the plurality of three-dimensional correct liver-tumor likelihood maps respectively corresponding to the plurality of pieces of abdominal CT image data from the training data acquisition unit 140. Next, the training unit 150 initializes the parameters of the training model. Then, using the plurality of pieces of abdominal CT image data and the plurality of three-dimensional correct liver-tumor likelihood maps respectively corresponding to the plurality of pieces of abdominal CT image data as training data sets, the training unit 150 trains the training model by a machine learning-based method. Further, the training unit 150 stores the parameters of the trained training model in the storage device 70. In the present exemplary embodiment, a 3D U-Net that is one of the CNNs is used as the training model. Specifically, the training unit 150 treats the three-dimensional abdominal CT image data and the three-dimensional correct liver-tumor likelihood map corresponding to the abdominal CT image data as a training data set, and trains the 3D U-Net using a plurality of pieces of training data.

At least some of the units included in the information processing apparatus 100 illustrated in FIG. 1 may be implemented as independent devices, or may be implemented as software modules to implement respectively different functions. In the present exemplary embodiment, assume that each unit is implemented by software.

Figure 2:
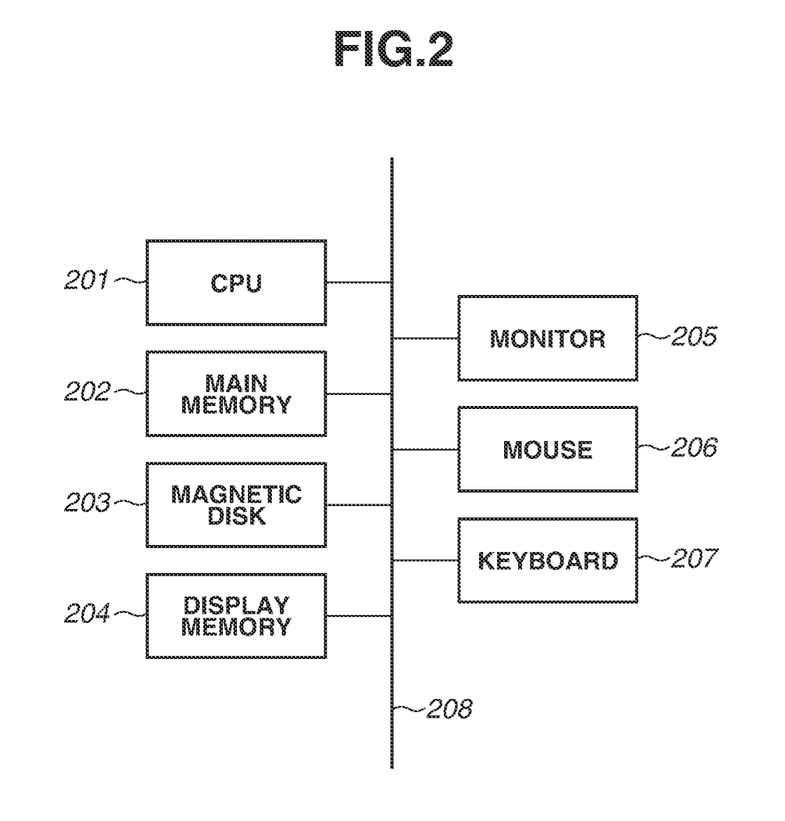
FIG. 2 is a block diagram illustrating a hardware configuration example of the information processing apparatus according to the first exemplary embodiment.

FIG. 2 is a block diagram illustrating an example of a hardware configuration of the information processing apparatus 100. The information processing apparatus 100 has a configuration of a known computer (information processing apparatus). The information processing apparatus 100 includes, as a hardware configuration, a central processing unit (CPU) 201, a main memory 202, a magnetic disk 203, a display memory 204, a monitor 205, a mouse 206, and a keyboard 207.

The CPU 201 mainly controls the operation of each component. The main memory 202 stores control programs to be executed by the CPU 201, and provides a work area for the CPU 201 to execute programs. The magnetic disk 203 stores programs for implementing various application software modules including programs for executing an operating system (OS), device drivers for peripheral devices, processing to be described below, and the like. The CPU 201 executes programs stored in the main memory 202 or the magnetic disk 203 to implement the functions (software) of the information processing apparatus 100 illustrated in FIG. 1 and processing in flowcharts to be described below.

The display memory 204 temporarily stores data for display. The monitor 205 is, for example, a cathode-ray tube (CRT) monitor or a liquid crystal monitor, and image data, text, and the like are displayed based on data supplied from the display memory 204. The mouse 206 and the keyboard 207 receive a pointing input operation and a character input operation, respectively, made by a user. The above-described components are communicably connected to each other via a common bus 208.

The CPU 201 is an example of a processor or a control unit. The information processing apparatus 100 may include not only the CPU 201, but also at least one of a graphics processing unit (GPU) and a field-programmable gate array (FPGA). The information processing apparatus 100 may include at least one of the GPU and FPGA in place of the CPU 201. The main memory 202 and the magnetic disk 203 are examples of a memory or a storage device.

Figure 3:
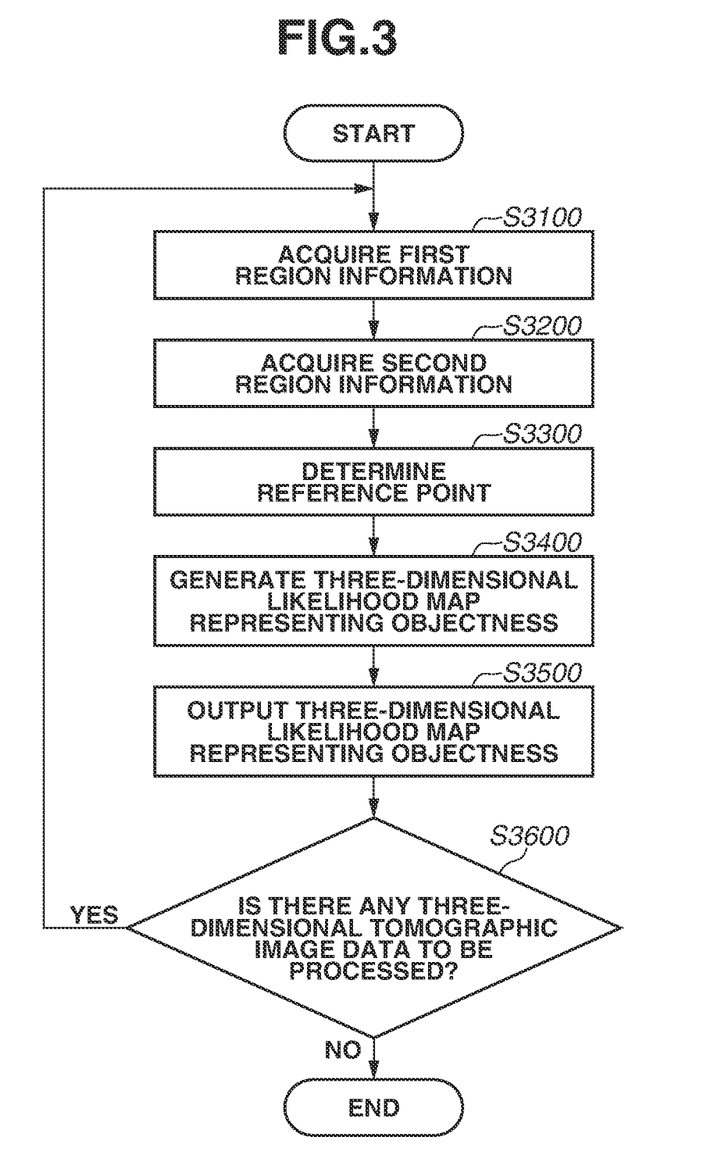
FIG. 3 illustrates an example of a processing procedure for the information processing apparatus according to the first exemplary embodiment.
Figure 5:
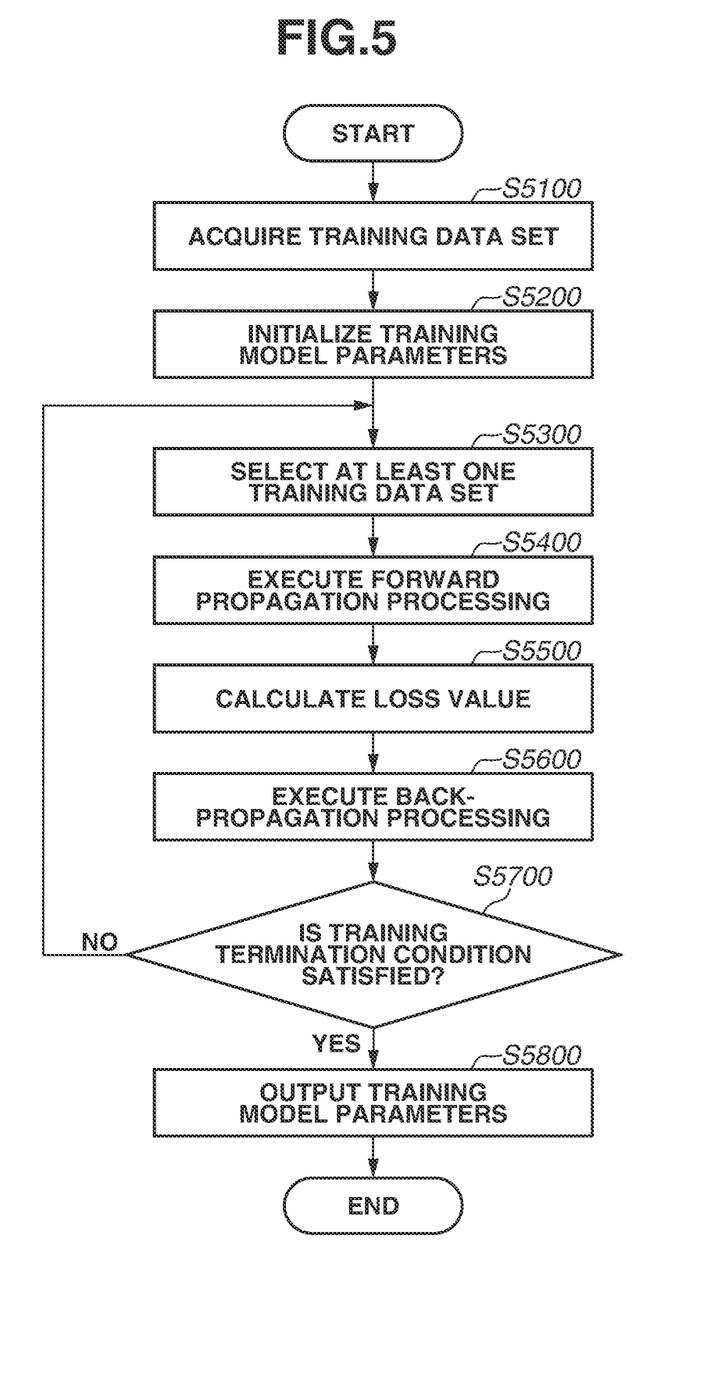
FIG. 5 is a flowchart illustrating an example of a processing procedure for the information processing apparatus according to the first exemplary embodiment.

Next, a flow of processing and a series of processing procedures executed by the information processing apparatus 100 according to the present exemplary embodiment will be described with reference to FIGS. 3 and 5. Processing procedures performed in the ground truth image data generation processing unit 101 of the information processing apparatus 100 will now be described with reference to FIG. 3.

In step S3100, the first acquisition unit 110 acquires the liver-tumor axial ground truth image data as the first region information about the object on the first two-dimensional tomographic image data orthogonal to the first axis of the three-dimensional tomographic image data from the storage device 70, and transmits the liver-tumor axial ground truth image data to the generation unit 130.

In step S3200, the second acquisition unit 120 acquires the liver-tumor coronal ground truth image data as the second region information about the object on the second two-dimensional tomographic image data orthogonal to the second axis different from the first axis of the three-dimensional tomographic image data from the storage device 70, and transmits the liver-tumor coronal ground truth image data to the generation unit 130.

In step S3300, the generation unit 130 generates the three-dimensional likelihood map representing the objectness as the three-dimensional ground truth image data corresponding to the three-dimensional tomographic image data based on the first region information and the second region information. Specifically, the generation unit 130 receives the liver-tumor axial ground truth image data as the first region information and the liver-tumor coronal ground truth image data as the second region information. Further, the generation unit 130 determines the reference point to be used to generate the three-dimensional correct liver-tumor likelihood map based on the liver-tumor axial ground truth image data and the liver-tumor coronal ground truth image data.

Figure 4A:
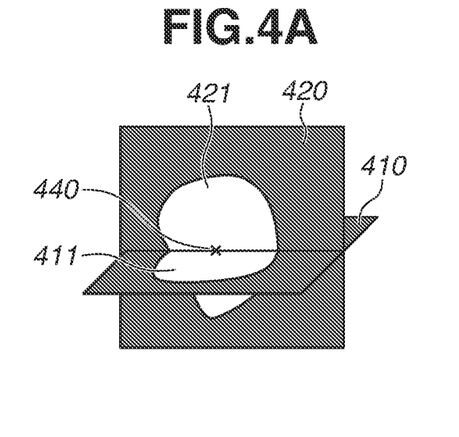
FIGS. 4A to 4E illustrate image data according to exemplary embodiments.

In the present exemplary embodiment, the generation unit 130 generates the three-dimensional liver-tumor likelihood map such that it spreads in an ellipsoidal shape (likelihood is concentrically and continuously varied) about the reference point, so that it is desirable to set the reference point at substantially the center of the liver tumor. Therefore, a method for determining the reference point at substantially the center of the liver tumor will be described below with reference to FIGS. 4A to 4E. FIG. 4A illustrates liver-tumor axial ground truth image data 410 as the first region information and liver-tumor coronal ground truth image data 420 as the second region information. The liver-tumor axial ground truth image data 410 holds a liver-tumor correct region 411 (hereinafter referred to as a liver-tumor axial region 411) captured in the representative axial section image data corresponding to the liver-tumor axial ground truth image data 410. Similarly, the liver-tumor coronal ground truth image data 420 holds a liver-tumor coronal region 421.

The liver-tumor axial ground truth image data 410 and the liver-tumor coronal ground truth image data 420 are two-dimensional image data acquired based on respectively different axes, and thus, as illustrated in FIG. 4A, the two pieces of two-dimensional ground truth image data intersect with each other on a three-dimensional space. As described above, the two pieces of two-dimensional ground truth image data hold the liver tumor region corresponding to a maximum liver-tumor sectional area in each axis direction. Therefore, the center of the liver tumor is considered to be located in the vicinity of a midpoint of a line segment on which the liver-tumor axial region 411 and the liver-tumor coronal region 421 intersect with each other. For this reason, the generation unit 130 determines the midpoint of the line segment as a reference point 440.

The method used by the generation unit 130 to determine the reference point is not limited to the above-described method. For example, the center of gravity of the liver-tumor axial region 411 or the center of gravity of the liver-tumor coronal region 421 may be set as the reference point, or the midpoint between the two centers of gravity may be set as the reference point. The generation unit 130 may acquire a bounding box corresponding to the liver-tumor axial region 411 and the liver-tumor coronal region 421, and may set the center coordinates of the bounding box as the reference point. Any other method may be employed as long as the coordinates indicating the substantial center of a liver tumor as an object can be selected.

In step S3400, the generation unit 130 generates the likelihood map representing the objectness such that a voxel located at a position closer to the reference point indicates a higher likelihood and a voxel located at a position farther from the reference point indicates a lower likelihood. Specifically, the generation unit 130 generates the three-dimensional correct liver-tumor likelihood map that spreads in an ellipsoidal shape (likelihood is concentrically and continuously varied) about the reference point determined in step S3300. In the present exemplary embodiment, the generation unit 130 generates the correct liver-tumor likelihood map using the multivariate Gaussian function which is a probability distribution function. The generation unit 130 calculates a liver-tumor likelihood $p_i$ in a voxel i in the correct liver-tumor likelihood map by the following expression (1).

$$p_i = \exp(-(\vec{x}_i - \vec{c})^T \Sigma^{-1} (\vec{x} - \vec{c})) \tag{1}$$

In Expression (1), a vector represented by the following expression (2) indicates the coordinates of the voxel i in the image data coordinate system.

$$\vec{x}_i = (x, y, z)^T \tag{2}$$

The following expression (3) represents a vector indicating the coordinates of the reference point 440 in the image data coordinate system.

$$\vec{c} = (c_x, c_y, c_z)^T \tag{3}$$

In addition, $\Sigma$ represents a covariance matrix and functions as a parameter for determining the degree of spread of the correct liver-tumor likelihood map. In particular, diagonal components in the covariance matrix indicate the variance in the X-axis (sagittal axis) direction, the Y-axis (coronal axis) direction, and the Z-axis (axial axis) direction, which is represented by the following expression (4).

$$\sigma_x^2, \sigma_y^2, \sigma_z^2 \tag{4}$$

The variance in each axis direction determines the degree of spread of the likelihood distribution in each axis direction. In other words, the liver-tumor likelihood in the voxel i is determined depending on the variance in each axis direction. In the present exemplary embodiment, an example is described where the variance in the X-axis direction, the variance in the Y-axis direction, and the variance in the Z-axis direction that are represented by the following expressions (5), (6), and (7), respectively, are set to obtain a liver-tumor likelihood of 0.5 in the vicinity of the contour of the liver tumor.

$$\sigma_x^2 = r_x^2 / \log(2) \tag{5}$$

$$\sigma_y^2 = r_y^2 / \log(2) \tag{6}$$

$$\sigma_z^T = r_z^2 / \log(2) \tag{7}$$

Figure 4B:
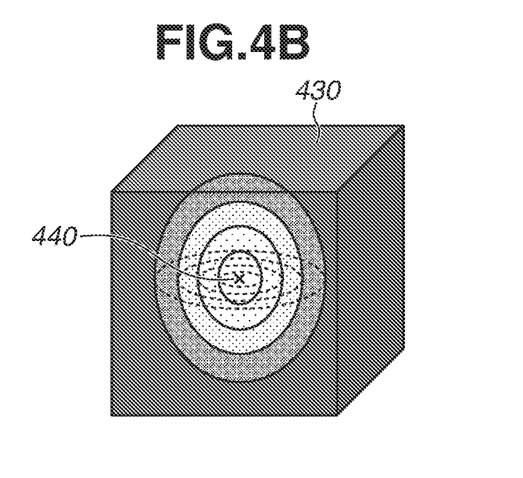

In the above-described expressions (5), (6), and (7), $r_x$, $r_y$, and $r_z$ represent the radius of the liver tumor in the X-axis direction, the radius of the liver tumor in the Y-axis direction, and the radius of the liver tumor in the Z-axis direction, respectively. The radius $r_x$, the radius $r_y$, and the radius $r_z$ can be acquired from the liver-tumor axial ground truth image data set as the first region information and the liver-tumor coronal ground truth image data set as the second region information. For example, since the liver-tumor axial ground truth image data 410 is image data on the XY-plane, the radius $r_x$ in the X-axis direction and the radius $r_y$ in the Y-axis direction can be acquired from the liver-tumor axial region 411. Similarly, since the liver-tumor coronal ground truth image data is image data on the XZ-plane, the radius $r_x$ in the X-axis direction and the radius $r_z$ in the Z-axis direction can be acquired from the liver-tumor coronal region 421. Thus, the generation unit 130 acquires the radius $r_x$ in the X-axis direction and the radius $r_y$ in the Y-axis direction from the liver-tumor axial region 411, and acquires the radius $r_z$ in the Z-axis direction from the liver-tumor coronal region 421. The generation unit 130 uses the radius $r_x$, the radius $r_y$, and the radius $r_z$ to determine the variance in each axis direction and generates the three-dimensional correct liver-tumor likelihood map according to Expression (1). FIG. 4B illustrates a three-dimensional correct liver-tumor likelihood map 430 generated by the generation unit 130 according to the present exemplary embodiment. In the three-dimensional correct liver-tumor likelihood map 430, a lighter color represents a voxel indicating a higher liver-tumor likelihood, and a darker color represents a voxel indicating a lower liver-tumor likelihood. In the three-dimensional correct liver-tumor likelihood map 430, the likelihood is varied such that the liver-tumor likelihood decreases toward an outermost voxel from the reference point 440. In other words, in the three-dimensional correct liver-tumor likelihood map 430 generated by the generation unit 130, the likelihood is varied in an ellipsoidal shape about the reference point 440.

The generation unit 130 may acquire the radius in each axis of the liver tumor by any method, as long as the radii corresponding to three arbitrary axes can be acquired. For example, the generation unit 130 may acquire a bounding box corresponding to the liver-tumor axial region 411 and the liver-tumor coronal region 421, and may calculate the radius in each axis based on the length of each side of the bounding box. Alternatively, the generation unit 130 may set a distance from the reference point to the farthest voxel in the voxels constituting the contours of the liver-tumor axial region 411 and the liver-tumor coronal region 421 as the radius in a first axis direction, and may acquire the other two radii based on two axis directions orthogonal to the first axis direction. In this case, the three axes do not match the X-axis, the Y-axis, and the Z-axis, and thus the liver-tumor likelihood map may be generated by a method similar to the method described above as an example, and then the liver-tumor likelihood map may be rotated in a space based on the three axes. Alternatively, the generation unit 130 can generate the liver-tumor likelihood map based on the three axes by setting values for elements other than the diagonal components in the covariance matrix.

If the liver-tumor axial region 411 and the liver-tumor coronal region 421 do not match on a line where the liver-tumor axial region 411 and the liver-tumor coronal region 421 intersect with each other, the generation unit 130 may acquire the radius in the X-axis direction using an average value, a maximum value, or a minimum value of the radii acquired from each region. The mismatch between the liver-tumor axial region 411 and the liver-tumor coronal region 421 indicates a case where, for example, a voxel of interest is included in the liver tumor region in one of the two pieces of two-dimensional ground truth image data and the voxel of interest is not included in the liver tumor region in the other of the two pieces of two-dimensional ground truth image data.

When the above-described processing is completed, step S3400 ends.

In step S3500, the generation unit 130 outputs the three-dimensional likelihood map representing the likelihood of the three-dimensional correct liver tumor region, and stores the three-dimensional likelihood map in the storage device 70.

In step S3600, the information processing apparatus 100 determines whether there is any three-dimensional tomographic image data (three-dimensional abdominal CT image data) to be processed. If there is three-dimensional tomographic image data to be processed (YES in step S3600), the processing returns to step S3100 to execute the ground truth image generation processing on the remaining learning image data. On the other hand, if there is no three-dimensional tomographic image data to be processed (NO in step S3600), the three-dimensional ground truth image data generation processing is terminated.

In accordance with the above-described procedures, the information processing apparatus 100 according to the present exemplary embodiment causes the ground truth image data generation processing unit 101 to generate the correct liver-tumor likelihood map.

Next, processing procedures performed in the training processing unit 102 of the information processing apparatus 100 will be described with reference to FIG. 5. The training processing unit 102 trains a training model by a machine learning-based method, using the correct liver-tumor likelihood map generated by the ground truth image data generation processing unit 101.

In step S5100, the training data acquisition unit 140 acquires a plurality of pieces of three-dimensional abdominal CT image data and a plurality of three-dimensional correct liver-tumor likelihood maps respectively corresponding to the plurality of pieces of abdominal CT image data as training data sets, and transmits the training data sets to the training unit 150. In other words, the training data acquisition unit 140 treats the abdominal CT image data and the correct liver-tumor likelihood map as a training data set and acquires a plurality of sets of training data, and transmits the plurality of sets of training data to the training unit 150.

In step S5200, the training unit 150 initializes the parameters of the 3D U-Net as the training model. Specifically, the training unit 150 initializes, for example, weight values of kernels of a convolutional layer by a known method. In the present exemplary embodiment, the convolutional layer is initialized by an initial value determination method that is based on a normal distribution proposed by He [Kaiming He, et al., "Delving Deep into Rectifiers: Surpassing Human-Level Performance on ImageNet Classification," International Conference on Computer Vision (ICCV), 2015]. The method of initializing the convolutional layer is not limited to this method, but instead any known method using a constant value, a random number value, or the like may be used. If the 3D U-Net includes a layer including parameters, such as a batch normalization layer or a dropout layer, the parameters in such layers are initialized by a known method.

In steps S5300 to S5700, the training unit 150 receives the training data sets from the training data acquisition unit 140, and trains the 3D U-Net as the training model using the training data sets. A method for training the 3D U-Net will be described below.

In step S5300, the training unit 150 selects a plurality of pieces of training data (batch) to update the parameters of the 3D U-Net from among the training data sets. Each training data set may include a pair of abdominal CT image data set as learning image data and a correct liver-tumor likelihood map corresponding to abdominal CT image data. In this step, one or more sets of training data are selected.

In step S5400, the training unit 150 inputs the abdominal CT image data included in the plurality of pieces of training data selected in step S5300 to the 3D U-Net, and executes forward propagation processing. The training unit 150 executes forward propagation processing to obtain a plurality of estimated liver-tumor likelihood maps respectively corresponding to the plurality of pieces of input abdominal CT image data.

In step S5500, the training unit 150 calculates a loss value based on the plurality of estimated liver-tumor likelihood maps obtained in step S5300 and the correct liver-tumor likelihood maps respectively corresponding to the plurality of estimated liver-tumor likelihood maps. For example, Mean Squared Error (MSE) is used as a loss function. The loss function is not limited to the MSE, but instead any other known method such as Mean Absolute Error (MAE) or Huber loss may be used as a loss function.

In step S5600, the training unit 150 obtains a gradient by a backpropagation method based on the loss value calculated in step S5500, and updates the parameters of the 3D U-Net. For example, a Stochastic Gradient Descent (SGD) method is used as an optimization method. The optimization method is not limited to the SGD method, but instead any other known method such as Adaptive Momentum (Adam) or Adaptive Gradient (AdaGrad) method may be used.

In step S5700, the training unit 150 determines whether a condition for termination of the training is satisfied and determines the subsequent step. Assume that the training termination condition is a condition in which the preset maximum number of epochs is reached, as an example. Specifically, if the preset maximum number of epochs is reached (YES in step S5700), the processing proceeds to step S5800, and in the other cases (NO in step S5700), the processing returns to step S5300. Any other condition may be used as the training termination condition. For example, a condition in which the difference between a loss value in the previous epoch and a loss value in the current epoch satisfies a designated condition may be set as the learning termination condition.

The above-described method is a typical 3D U-Net learning method for inferring the liver-tumor likelihood map.

In step S5800, the training unit 150 outputs the parameters of the training model and stores the parameters in the storage device 70.

In accordance with the above-described procedures, the information processing apparatus 100 according to the present exemplary embodiment causes the training processing unit 102 to train the training model for inferring the liver-tumor likelihood map by a machine learning-based method using the correct liver-tumor likelihood map generated by the ground truth image data generation processing unit 101.

As described above, the information processing apparatus 100 according to the present exemplary embodiment generates a correct object likelihood map (ground truth image data) based on the two-dimensional ground truth image data (first region information) corresponding to the first axis of the object and the two-dimensional ground truth image data (second region information) corresponding to the second axis of the object. Consequently, it is possible to efficiently generate three-dimensional ground truth image data that can be used to train a training model based on machine learning.

Modified Examples

While in the above-described example, the correct object likelihood map is generated such that it spreads in an ellipsoidal shape (likelihood is concentrically and continuously varied) based on a probability distribution function, the method of generating the likelihood map that spreads in an ellipsoidal shape is not limited to this example. For example, the likelihood map that spreads in an ellipsoidal shape may be generated using an Euclidean distance from the reference point. In this case, the generation unit 130 calculates the Euclidean distance from the reference point for each voxel and normalizes the distance value such that the Euclidean distance for each voxel falls within the range of "0" to "1", thereby generating the likelihood map. In this case, for example, the distance value is normalized by any method such that the likelihood of 0.5 is obtained in the vicinity of the contour of the object.

The normalized distance value is set as the likelihood representing the objectness.

In the above-described example, the first axis corresponds to the axial axis (Z-axis) and the second axis corresponds to the coronal axis (Y-axis). However, any combination of axes may be used as long as the first axis and the second axis are axes in respectively different directions. For example, the sagittal axis (X-axis) may be used, and any axes different from the X-axis, the Y-axis, and the Z-axis may be used. In addition, the first axis and the second axis need not be orthogonal to each other.

Figure 4C:
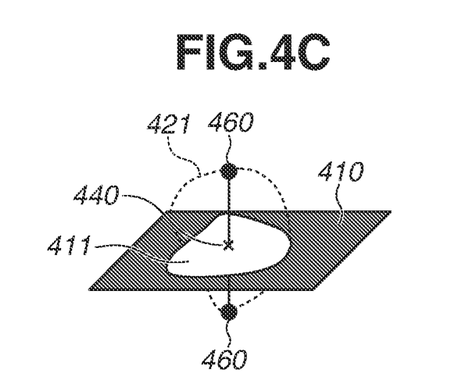

In the above-described example, the second region information (or the first region information) is two-dimensional ground truth image data on the object corresponding to the second axis. However, any type of information may be used as long as the information includes at least a position and a size of the object. For example, as illustrated in FIG. 4C, in the case of using two contour points 460 on the liver tumor on the coronal section image data as the second region information, an intersection between the liver-tumor axial ground truth image data 410 set as the first region information and a line segment connecting the two contour points 460 is set as the reference point 440. The correct liver-tumor likelihood map is generated in the same manner as in the example described above by acquiring the radius in the X-axis direction and the radius in the Y-axis direction from the liver-tumor axial ground truth image data 410 and acquiring the radius in the Z-axis direction from the line segment connecting the two contour points 460. The above-described method can also be applied when the center coordinates and the radius of an ellipsoid obtained by approximating the liver tumor on the two-dimensional tomographic image data orthogonal to any axis to an ellipsoidal shape are used as the second region information.

While in the above-described example, two pieces of region information about the object are used, three or more pieces of region information may be used to generate the correct object likelihood map. The generation unit 130 acquires, for example, two or more pieces of second region information orthogonal to the second axis, and generates the three-dimensional likelihood map based on the two or more pieces of second region information. In other words, for example, the use of a plurality of pieces of second two-dimensional tomographic image data enables the generation unit 130 to accurately generate the three-dimensional likelihood map. Not only the two or more pieces of second two-dimensional tomographic image data, but also one or more pieces of first two-dimensional tomographic image data and one or more pieces of third two-dimensional tomographic image data may be used.

Alternatively, the generation unit 130 may use pieces of region information corresponding to three different axes. For example, the liver-tumor axial ground truth image data (first region information corresponding to the first axis) corresponding to the first two-dimensional tomographic image data, the liver-tumor coronal ground truth image data (second region information corresponding to the second axis) corresponding to the second two-dimensional tomographic image data, and liver tumor sagittal ground truth image data (third region information corresponding to the third axis) corresponding to the third two-dimensional tomographic image data may be used. In this case, the reference point is determined in accordance with procedures similar to the procedures described in the above-described example, and the degree of spread of the likelihood distribution in each axis direction is determined based on the radius in each axis direction, thereby enabling generation of the correct object likelihood map. In addition, region information corresponding to the first axis and two pieces of region information corresponding to the second axis may be used. For example, liver-tumor axial ground truth image data, first coronal ground truth image data on the liver tumor, and second coronal ground truth image data on the object may be used. In this case, the reference point and the degree of spread of the likelihood distribution in each axis direction are determined in accordance with procedures similar to the procedures described in the above-described example, thereby enabling generation of the liver-tumor likelihood map.

In the above-described example, the deep learning-based method such as a 3D U-Net is used as the training model. However, the training model is not limited to this example. For example, a support vector machine (SVM) or a classification tree may be used as the training model. In this case, an appropriate learning method may be used depending on the training model.

The information processing apparatus 100 according to the first exemplary embodiment generates the correct liver-tumor likelihood map using a probability distribution function. A second exemplary embodiment will be described using an example where an information processing apparatus 100 according to the second exemplary embodiment generates ellipsoidal mask image data representing a rough region of a liver tumor based on an ellipsoid equation, and generates a three-dimensional correct liver-tumor likelihood map based on the mask image data.

The information processing apparatus 100 according to the present exemplary embodiment has the same configuration as that of the information processing apparatus 100 according to the first exemplary embodiment. A functional configuration of the information processing apparatus 100 according to the present exemplary embodiment will be described below with reference to FIG. 1, and descriptions of the same components as those of the information processing apparatus 100 according to the first exemplary embodiment are omitted. In the information processing apparatus 100 according to the present exemplary embodiment, the storage device 70, the first acquisition unit 110, the second acquisition unit 120, the training data acquisition unit 140, and the training unit 150 are the same as those of the first exemplary embodiment, and thus the descriptions thereof are omitted.

The generation unit 130 receives the liver-tumor axial ground truth image data as the first region information from the first acquisition unit 110, and receives the liver-tumor coronal ground truth image data as the second region information from the second acquisition unit 120. Next, the generation unit 130 determines the reference point based on the liver-tumor axial ground truth image data and the liver-tumor coronal ground truth image data, and generates ellipsoidal mask image data representing the rough region of the liver tumor based on an ellipsoid equation. Then, the generation unit 130 smooths the ellipsoidal mask image data representing the rough region of the liver tumor using a Gaussian filter, thereby generating the correct liver-tumor likelihood map. The generation unit 130 stores the correct liver-tumor likelihood map in the storage device 70.

The information processing apparatus 100 according to the present exemplary embodiment has the same hardware configuration as that of the first exemplary embodiment, and thus the description thereof is omitted.

Next, processing procedures executed in the ground truth image data generation processing unit 101 of the information processing apparatus 100 according to the present exemplary embodiment will be described with reference to FIG. 3. In the following description, descriptions of the same components as those of the information processing apparatus 100 according to the first exemplary embodiment are omitted.

Steps S3100 to S3300 are identical to steps S3100 to S3300 described in the first exemplary embodiment, and thus the descriptions thereof are omitted.

In step S3400, the generation unit 130 generates the correct liver-tumor likelihood map such that it spreads in an ellipsoidal shape (likelihood is concentrically and continuously varied) about the reference point determined in step S3300. First, the generation unit 130 according to the present exemplary embodiment generates ellipsoidal mask image data representing the rough region of the liver tumor based on an ellipsoid equation. Then, the generation unit 130 smooths the ellipsoidal mask image data representing the rough region of the liver tumor using a Gaussian filter or the like, thereby generating the correct liver-tumor likelihood map.

Figure 4D:
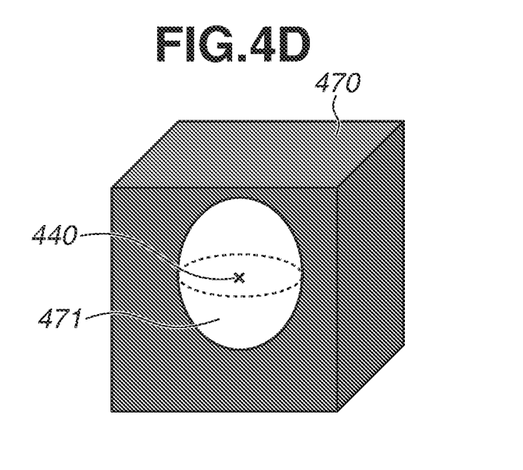

A method for generating ellipsoidal mask image data representing the rough region of the liver tumor will be described with reference to FIGS. 4A to 4E. FIG. 4D illustrates ellipsoidal mask image data 470 representing the rough region of the liver tumor. In the present exemplary embodiment, a voxel corresponding to coordinates (x, y, z) that satisfy the following condition is considered to belong to the ellipsoid representing the rough region of the liver tumor.

$$\frac{(x-c_x)^2}{r_x^2} + \frac{(y-c_y)^2}{r_y^2} + \frac{(z-c_z)^2}{r_z^2} \leq 1 \qquad (8)$$

In Expression (8), $(c_x, c_y, c_z)$ represents the coordinates of the reference point 440 in the image data coordinate system determined in step S3300, and $(r_x, r_y, r_z)$ represents the radii in the respective axis directions based on the reference point 440. The radius in each axis direction based on the reference point 440 is acquired by a method similar to that of the first exemplary embodiment. The ellipsoidal mask image data 470 holds an ellipsoid region 471 representing the rough region of the liver tumor. For example, assume that the value of the voxel included in the ellipsoid region 471 is represented by "1" (depicted in lighter color) and the value of any voxel other than the voxel included in the ellipsoid region 471 is represented by "0" (depicted in darker color). In other words, in the ellipsoidal mask image data 470, the value of a voxel that satisfies the condition represented by Expression (2) is represented by "1" and the value of any voxel other than the voxel that satisfies the condition is represented by "0".

Next, the generation unit 130 applies the Gaussian filter to smooth the ellipsoidal mask image data 470 representing the rough region of the liver tumor, thereby generating the correct liver-tumor likelihood map 430. In the correct liver-tumor likelihood map 430 generated as described above, a voxel (liver-tumor likelihood) located at a position closer to the reference point 440 has a higher voxel value, and a voxel located at a position farther from the reference point 440 has a lower voxel value.

The method used by the generation unit 130 to generate the correct liver-tumor likelihood map is not limited to smoothing using the Gaussian filter. Any other method may be used as long as the likelihood map can be generated such that a voxel located on an inner side of the contour of the ellipsoid region indicates a higher likelihood and a voxel located on an outer side of the contour of the ellipsoid region indicates a lower likelihood. For example, the generation unit 130 generates the likelihood map representing the objectness based on a distance from the contour of a region corresponding to three-dimensional region image data. Specifically, the generation unit 130 may generate the correct liver-tumor likelihood map by converting the ellipsoidal mask image data representing the rough region of the liver tumor into a distance, generating a distance map based on the distance from the contour of the ellipsoid region 471, and normalizing voxel values (distance values) in the distance map.

Steps S3500 and S3600 are identical to steps S3500 and S3600 described in the first exemplary embodiment, and thus the descriptions thereof are omitted.

In accordance with the above-described procedures, the information processing apparatus 100 according to the present exemplary embodiment causes the ground truth image data generation processing unit 101 to generate the correct liver-tumor likelihood map. Further, in accordance with the same processing procedures as those executed in the training processing unit 102 according to the first exemplary embodiment, the information processing apparatus 100 according to the present exemplary embodiment trains the training model for inferring the liver-tumor likelihood map by a machine learning-based method using the correct liver-tumor likelihood map as ground truth image data.

As described above, the information processing apparatus 100 according to the present exemplary embodiment generates the three-dimensional correct object likelihood map (ground truth image data) based on the two-dimensional ground truth image data (first region information) corresponding to the first axis of the object and the two-dimensional ground truth image data (second region information) corresponding to the second axis of the object. Consequently, it is possible to efficiently generate ground truth image data that can be used to train a training model based on machine learning. Further, the information processing apparatus 100 may cause a control unit to perform inference processing using the trained training model.

While in the above-described examples, a method has been described in which the generation unit 130 generates the three-dimensional object likelihood map by approximating an object to an ellipsoid, the generation method is not limited to this method. For example, in a case of an object that has a substantially cylindrical shape (such as a spine), the generation unit 130 first generates cylindrical mask image data representing a rough object region based on a cylinder equation using the first region information and the second region information. To generate the cylindrical mask image data, the radius and height of the cylinder are to be acquired. Thus, the information about the radius and height of the cylinder may be acquired based on region information corresponding to each axis. Like in the examples described above, the generation unit 130 generates the correct object likelihood map by smoothing the cylindrical mask image data representing the rough region of the object. Similarly, in a case where the object has a substantially cuboid shape, the generation unit 130 acquires the length of each side of the cuboid based on the first region information and the second region information, generates cuboid mask image data representing a rough object region, and smooths the mask image data to generate the three-dimensional correct object likelihood map. In addition, the generation unit 130 may use a parametric shape model and generate the three-dimensional region image data by approximating the object region to the parametric shape. In this case, the generation unit 130 acquires dependent parameters to represent the parametric shape model from the first region information and the second region information. Examples of the parametric shape model include a function of a closed surface and a statistical shape model. In these cases, the generation unit 130 may set the substantial center of the object as the reference point, or may set a characteristic point, such as an upper end or a lower end of the object, as the reference point.

In the first and second exemplary embodiments described above, the method for generating the correct liver-tumor likelihood map by approximating the liver tumor region to an ellipsoid has been described. In a third exemplary embodiment, a method for generating the correct liver-tumor likelihood map by interpolating the first region information and/or the second region information will be described. In the present exemplary embodiment, the liver-tumor axial ground truth image data is used as the first region information and two contour points on the liver tumor on the representative coronal section image data are used as the second region information.

An information processing apparatus 100 according to the present exemplary embodiment generates the correct liver-tumor likelihood map by performing a linear interpolation (morphing) on the liver-tumor axial ground truth image data (first region information corresponding to the first axis) in the direction of the line segment (second axis) connecting the two contour points on the liver tumor. In this case, the information processing apparatus 100 generates the liver-tumor likelihood map such that a voxel located at a longer distance from the liver-tumor axial region on the liver-tumor axial ground truth image data indicates a higher liver-tumor likelihood and a voxel located at a shorter distance from the liver-tumor axial region indicates a lower liver-tumor likelihood.

The information processing apparatus 100 according to the present exemplary embodiment has the same configuration as that of the information processing apparatus 100 according to the first exemplary embodiment. A functional configuration of the information processing apparatus 100 according to the present exemplary embodiment will be described below with reference to FIG. 1, and descriptions of the same components as those of the information processing apparatus 100 according to the first exemplary embodiment are omitted. In the information processing apparatus 100 according to the present exemplary embodiment, the first acquisition unit 110, the training data acquisition unit 140, and the training unit 150 are identical to those of the first exemplary embodiment, and thus the descriptions thereof are omitted.

The storage device 70 holds the abdominal CT image data as the three-dimensional tomographic image data in which the object is captured, the liver-tumor axial ground truth image data as the first region information, and two contour points on the liver tumor on the representative coronal section image data as the second region information. The two contour points on the liver tumor on the representative coronal section image data are, for example, coordinate values in the image coordinate system.

The second acquisition unit 120 acquires two contour points on the liver tumor on the representative coronal section image data as the second region information from the storage device 70, and transmits the two contour points to the generation unit 130.

The generation unit 130 receives the liver-tumor axial ground truth image data as the first region information from the first acquisition unit 110, and also receives the two contour points on the liver tumor on the representative coronal section image data as the second region information from the second acquisition unit 120. Next, the generation unit 130 generates the correct liver-tumor likelihood map by performing a linear interpolation on the liver-tumor axial ground truth image data in the coronal axis direction based on the two contour points on the liver tumor on the representative coronal section image data. The generation unit 130 stores the correct liver-tumor likelihood map in the storage device 70.

The information processing apparatus 100 according to the present exemplary embodiment has the same hardware configuration as that of the first exemplary embodiment, and thus the description thereof is omitted.

Next, processing procedures executed in the ground truth image data generation processing unit 101 of the information processing apparatus 100 according to the present exemplary embodiment will be described with reference to FIG. 3. In the following description, descriptions of the same components as those of the information processing apparatus 100 according to the first exemplary embodiment are omitted.

Step S3100 is identical to step S3100 in the first exemplary embodiment, and thus the description thereof is omitted.

In step S3200, the second acquisition unit 120 acquires two contour points on the liver tumor on the representative coronal section image data as the second region information from the storage device 70, and transmits the two contour points to the generation unit 130.

Step S3300 is identical to step S3300 in the first exemplary embodiment, and thus the description thereof is omitted.

In step S3400, the generation unit 130 receives the liver-tumor axial ground truth image data as the first region information and two contour points on the liver tumor on the representative coronal section image data as the second region information. Then, the generation unit 130 generates the correct liver-tumor likelihood map by performing a linear interpolation on the liver-tumor axial ground truth image data in the coronal axis direction based on the two contour points on the liver tumor on the representative coronal section image data.

Figure 4E:
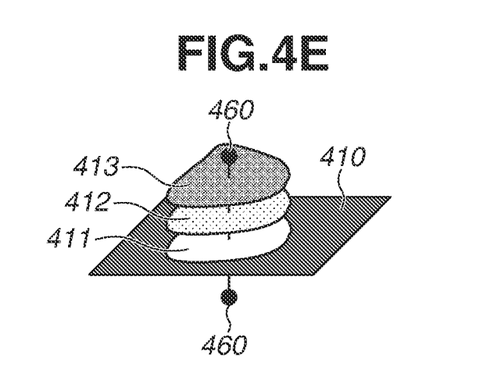

As illustrated in FIG. 4C, assume that the liver-tumor axial ground truth image data 410 is provided as the first region information and the two contour points 460 on the liver tumor on the representative coronal section image data are provided as the second region information. In this case, the information processing apparatus 100 sets the two contour points 460 as end points and performs a linear interpolation on the liver-tumor axial region 411 along the line segment connecting the two contour points 460, thereby generating the correct liver-tumor likelihood map. FIG. 4E is a conceptual diagram illustrating a method for generating the correct liver-tumor likelihood map by linear interpolation. For example, the generation unit 130 generates the correct liver-tumor likelihood map such that the liver-tumor likelihood increases toward the position where the liver-tumor axial region 411 is present (depicted in lighter color) and the liver-tumor likelihood decreases toward an axial region 412, an axial region 413, and the contour points 460 (depicted in darker color). Specifically, the generation unit 130 generates the likelihood map representing the objectness such that a voxel located at a shorter distance from the region corresponding to the first region information and/or the second region information indicates a higher likelihood and a voxel located at a longer distance from the corresponding region indicates a lower likelihood. With this configuration, the information processing apparatus 100 generates the likelihood map such that a region located in the vicinity of the two-dimensional ground truth image data provided as the first region information indicates a higher liver-tumor likelihood and a region located at a position farther from the two-dimensional ground truth image data indicates a lower liver-tumor likelihood in a three-dimensional space. Consequently, it is possible to efficiently generate three-dimensional ground truth image data that can be used to trains a training model based on machine learning.

Steps S3500 and S3600 are identical to steps S3500 and S3600, respectively, in the first exemplary embodiment, and thus the descriptions thereof are omitted.

As described above, the information processing apparatus 100 according to the present exemplary embodiment generates the three-dimensional correct object likelihood map (ground truth image data) based on the two-dimensional ground truth image data (first region information) corresponding to the first axis of the object and the two-dimensional ground truth image data (second region information) corresponding to the second axis of the object. Thus, ground truth image data that can be used to train a training model based on machine learning can be efficiently generated. Further, the information processing apparatus 100 may perform inference processing using the trained training model.

According to the above-described procedures, the information processing apparatus 100 according to the present exemplary embodiment causes the ground truth image data generation processing unit 101 to generate the correct liver-tumor likelihood map. Further, in accordance with the same processing procedures as those executed in the training processing unit 102 according to the first exemplary embodiment, the information processing apparatus 100 trains the training model for inferring the liver-tumor likelihood map by a machine learning-based method using the correct liver-tumor likelihood map as ground truth image data.

Modified Examples

While the correct liver-tumor likelihood map is generated by linear interpolation in the above-described example, the interpolation method is not limited to the linear interpolation. For example, assume that the liver-tumor axial ground truth image data is provided as the first region information and the liver-tumor coronal ground truth image data is provided as the second region information.

In this case, the correct liver-tumor likelihood map may be generated by rotating the liver tumor region held in each of the pieces of two-dimensional ground truth image data about an axis shared by the sections of the two regions (a type of interpolation method) to generate two rotating bodies and by integrating the two rotating bodies. The rotating bodies may be generated based on any known method. For example, an upper-half rotating body can be generated using the contour on the upper side of the axis, and a lower-half rotating body can be generated using the contour on the lower side of the axis. The rotating bodies may be integrated based on a weighted average value, a maximum value, or a minimum value for each voxel. In the case of using a weighted mean, it is desirable to set the weights of the rotating bodies such that the rotating body generated based on the first region information has a larger weight at an angle closer to first representative two-dimensional tomographic image data and the rotating body generated based on the second region information has a larger weight at an angle closer to second representative two-dimensional tomographic image data. According to the above-described exemplary embodiments, it is possible to generate three-dimensional region information in which pieces of region information about two sections are approximated to each other as much as possible.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the claims are not limited to the disclosed exemplary embodiments. The scope of the following claims is to be accorded the broadest reasonable interpretation so as to encompass all such modifications and equivalent structures and functions.

This application claims the priority benefit of Japanese Patent Application No. 2021-192191, filed Nov. 26, 2021, which is hereby incorporated by reference herein in its entirety.

What is claimed is:

1. An information processing apparatus comprising:
one or more processors that operate to:
acquire first region information about an object on first two-dimensional tomographic image data orthogonal to a first axis of three-dimensional tomographic image data;
acquire second region information about the object on second two-dimensional tomographic image data orthogonal to a second axis different from the first axis of the three-dimensional tomographic image data; and
generate three-dimensional region image data based on the first region information and the second region information; and
generate a three-dimensional likelihood map representing objectness of the object as three-dimensional ground truth image data corresponding to the three-dimensional tomographic image data based on three-dimensional region image data that is generated based on the first region information and the second region information, wherein the three-dimensional likelihood map representing the objectness of the object is generated in such a manner that a voxel located on an inner side of a contour of the three-dimensional region image data indicates a higher likelihood and a voxel located on an outer side of the contour indicates a lower likelihood.

2. The information processing apparatus according to claim 1, wherein the one or more processors acquire two or more pieces of second region information orthogonal to the second axis, and the one or more processors generate the three-dimensional likelihood map based on the two or more pieces of second region information.

3. The information processing apparatus according to claim 2,
wherein the one or more processors acquire the two or more pieces of second region information about the object on the second two-dimensional tomographic image data orthogonal to the second axis of the three-dimensional tomographic image data, and third region information about the object on third two-dimensional tomographic image data orthogonal to a third axis different from the first axis and the second axis of the three-dimensional tomographic image data, and
wherein the one or more processors generate the three-dimensional likelihood map representing the objectness corresponding to the three- dimensional tomographic image data based on the first region information, the two or more pieces of second region information, and the third region information.

4. The information processing apparatus according to claim 1, wherein at least one of the first region information and the second region information includes information about a position and a size of the object corresponding to each axis.

5. The information processing apparatus according to claim 1, wherein at least one of the first region information and the second region information is two-dimensional ground truth image data about the object corresponding to each axis.

6. The information processing apparatus according to claim 1, wherein the one or more processors generate the three-dimensional region image data based on a parametric shape model.

7. The information processing apparatus according to claim 6, wherein the one or more processors generate the three-dimensional likelihood map representing the objectness by smoothing the three-dimensional region image data.

8. The information processing apparatus according to claim 6, wherein the one or more processors generate the three-dimensional likelihood map representing the objectness based on a distance from a contour of a region corresponding to the three-dimensional region image data.

9. The information processing apparatus according to claim 1, wherein the one or more processors generate the three-dimensional likelihood map representing the objectness in such a manner that a voxel located at a shorter distance from a region corresponding to at least one of the first region information and the second region information indicates a higher likelihood and a voxel located at a longer distance from the region indicates a lower likelihood.

10. The information processing apparatus according to claim 1, wherein the one or more processors further operate to train a training model by a machine learning-based method using the three-dimensional tomographic image data and the three-dimensional likelihood map representing the objectness as training data.

11. The information processing apparatus according to claim 10, wherein the one or more processors further operate to perform inference processing using the training model trained by the training one or more processors.

12. An information processing method comprising:
acquiring first region information about an object on first two-dimensional tomographic image data orthogonal to a first axis of three-dimensional tomographic image data;
acquiring second region information about the object on second two-dimensional tomographic image data orthogonal to a second axis different from the first axis of the three-dimensional tomographic image data; and
generating a three-dimensional likelihood map representing objectness of the object as three-dimensional ground truth image data corresponding to the three-dimensional tomographic image data based on the first region information and the second region information,
wherein, in the generating, three-dimensional region image data is generated based on the first region information and the second region information, and the three-dimensional likelihood map representing the objectness is generated in such a manner that a voxel located on an inner side of a contour of the three-dimensional region image data indicates a higher likelihood and a voxel located on an outer side of the contour indicates a lower likelihood.

13. The information processing method according to claim 12, further comprising training a training model by a machine learning-based method using the three-dimensional tomographic image data and the three-dimensional likelihood map representing the objectness as training data.

14. The information processing method according to claim 13, further comprising performing inference processing using the training model generated in the training.

15. A non-transitory storage medium storing a program for causing a computer to execute the information processing method according to claim 12.

16. An information processing apparatus comprising:
one or more processors that operate to:
acquire first region information about an object on first two-dimensional tomographic image data orthogonal to a first axis of three-dimensional tomographic image data;
acquire second region information about the object on second two-dimensional tomographic image data orthogonal to a second axis different from the first axis of the three-dimensional tomographic image data;
determine a reference point based on at least one of the first region information and the second region information; and
generate a three-dimensional likelihood map representing objectness of the object as three-dimensional ground truth image data corresponding to the three-dimensional tomographic image data based on the reference point that is determined based on the first region information and the second region information, wherein the three-dimensional likelihood map is generated in such a manner that a voxel located closer to the reference point indicates a higher likelihood and a voxel located farther fom the reference point indicates a lower likelihood.

* * * * *